(12) United States Patent
Chauvin

(10) Patent No.: US 9,604,505 B2
(45) Date of Patent: Mar. 28, 2017

(54) THICK TREAD FOR CIVIL ENGINEERING TIRES

(71) Applicants: COMPAGNIE GENERALE DES ETABLISSMENTS MICHELIN, Clermont-Ferrand (FR); MICHELIN RECHERCHE ET TECHNIQUE S.A., Granges-Paccot (CH)

(72) Inventor: Dominique Chauvin, Clermont-Ferrand (FR)

(73) Assignees: COMPAGNIE GENERALE DES ESTABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 138 days.

(21) Appl. No.: 14/384,510

(22) PCT Filed: Feb. 22, 2013

(86) PCT No.: PCT/EP2013/053537
§ 371 (c)(1),
(2) Date: Sep. 11, 2014

(87) PCT Pub. No.: WO2013/135473
PCT Pub. Date: Sep. 19, 2013

(65) Prior Publication Data
US 2015/0027605 A1    Jan. 29, 2015

(30) Foreign Application Priority Data

Mar. 15, 2012  (FR) .................................. 12 52368

(51) Int. Cl.
B60C 11/03    (2006.01)
B60C 11/04    (2006.01)
B60C 11/13    (2006.01)

(52) U.S. Cl.
CPC ...... B60C 11/0306 (2013.04); B60C 11/0309 (2013.04); B60C 11/042 (2013.04);
(Continued)

(58) Field of Classification Search
CPC . B60C 11/03; B60C 11/0306; B60C 11/0309; B60C 11/032; B60C 11/0339;
(Continued)

(56) References Cited

U.S. PATENT DOCUMENTS 3,508,594 A * 4/1970 French ................ B60C 11/0306
152/209.16
4,320,790 A * 3/1982 Corner .................... B60C 11/11
152/209.27

(Continued)

FOREIGN PATENT DOCUMENTS

EP    1454768    9/2004
EP    1759890    3/2007
(Continued)

OTHER PUBLICATIONS

International Search Report for PCT/EP2013/053537 dated Apr. 29, 2013.

*Primary Examiner* — Eric Hug
(74) *Attorney, Agent, or Firm* — Dickinson Wright PLLC

(57) ABSTRACT

Tread for civil engineering tires, having blocks in the central part and edge ribs, each block having a width Ltb measured parallel to transverse edges and a width Lcb measured along the circumferential direction, wherein each edge rib has a plurality of recesses, forming housings, with a transverse width Lte and a circumferential length Lce, delimited over the whole of its height He by transversely orientated walls and a circumferentially orientated wall, having a suitable geometry to receive at least an end part of a block of the central region with a circumferential clearance Ac in the
(Continued)

circumferential direction and a transverse clearance At in the transverse or axial direction, these clearances determined to ensure that, in the usual running conditions of the tire the end part of said block of the central region is at least partially in contact with at least one of the transversely orientated walls of each recess, thereby preventing each of the blocks, having its ends locked in said recesses, from coming into contact with the neighboring blocks of the central row.

6 Claims, 2 Drawing Sheets

(52) U.S. Cl.
CPC . *B60C 2011/0355* (2013.04); *B60C 2011/133* (2013.04); *B60C 2200/065* (2013.04)

(58) Field of Classification Search
CPC ............ B60C 11/0341; B60C 11/0346; B60C 11/0386; B60C 11/039; B60C 2011/0355; B60C 11/04; B60C 11/042; B60C 11/11; B60C 11/13; B60C 2011/133; B60C 2011/1338; B60C 11/1376; B60C 2200/06; B60C 2200/065
USPC .. 152/900, 901, 902, 209.1, 209.16, 209.18; D12/512, 544, 571, 572, 579
See application file for complete search history.

(56) References Cited

U.S. PATENT DOCUMENTS

| 7,281,555 | B2 * | 10/2007 | Ono | B60C 11/00 152/209.13 |
|---|---|---|---|---|
| 2007/0199633 | A1 | 8/2007 | Hayashi | |
| 2013/0153105 | A1 * | 6/2013 | Bournat | B60C 11/0309 152/209.21 |

FOREIGN PATENT DOCUMENTS

| FR | 2961744 | * | 12/2011 | ......... B60C 11/0309 |
|---|---|---|---|---|
| GB | 1366300 | * | 9/1974 | ......... B60C 11/0306 |

* cited by examiner

THICK TREAD FOR CIVIL ENGINEERING TIRES

This application is a 371 national phase entry of PCT/EP2013/053537, filed 22 Feb. 2013, which claims benefit of FR 1252368, filed 15 Mar. 2012, the entire contents of which are incorporated herein by reference for all purposes.

BACKGROUND

1. Field

The disclosure relates to a tire for civil engineering vehicle (of the type called "off-road" in English) having a tread with a thickness of at least 25 mm. More specifically, the disclosure relates to a new type of tread having a sculpture pattern capable of limiting the differences in shear strain between the tread pattern elements that may be created, notably, by running along a curved path.

These differences in shear strain may give rise to an embrittlement of the bottoms of the grooves forming the tread pattern.

2. Description of Related Art

A tire intended to be fitted to a civil engineering vehicle is usually provided with a tread which radially surmounts the outside of a crown reinforcement which itself surmounts a carcass reinforcement. This tread has a pattern formed by relief elements (ribs or blocks), these relief elements being delimited by a plurality of grooves; the thickness of this pattern is at least 25 mm and may be as much as 110 mm ("thickness of the pattern", in this context, means the maximum depth of the grooves).

The relief elements of the tread have faces—called contact faces—located radially outside the tread and provided for making contact with the ground. The grooves have a depth equal to or less than the thickness of the tread, and have geometries, viewed in cross section, which are suitable for limiting the retention of pebbles and other objects present on the ground.

In running along a curved path, a considerable extension of the material forming the tread is observed, this extension being caused directly by the drifting of the tire and indirectly by the compression of the material forming the tread under the load supported, this load generating extension constraints by the Poisson effect. Owing to the position of each circumferential row relative to the centre of curvature during running along a curved path, a local variation of the distances travelled by each circumferential row is observed, and is manifested in differences in stress and shear between the rows.

These differences in stress and shear are further amplified by present-day requirements regarding tires for civil engineering vehicles, leading to an increase in the load-carrying capacity. In these operating conditions, there is a demand for improved traction performance on different types of ground and, as far as possible, improved wear performance (increased distance travelled before removal of the tire for a given wearable thickness).

In order to meet these requirements, there is a known way of increasing, to a very substantial degree, the thickness of wearable tread material and consequently increasing the groove depths, thereby increasing the heights of the relief elements.

During their passage through the contact patch, the relief elements are subjected to compressive forces and tangential stresses which bend them in a circumferential direction, in a transverse direction, and also in an oblique direction. These movements, which increase with the height of the blocks, may give rise to rapid localized wear as well as cracking of the rubber on the bottoms of grooves, which may then lead to infiltrations of water as far as the inner reinforcements of the tire.

To limit this phenomenon, there is a known way of placing platforms between the blocks, the purpose of these blocks being to limit the bending movement of the blocks during running. These platforms extend over only a part of the height of the blocks, so as to retain the greatest possible edge length, at least in the new state. A drawback of the presence of these platforms is the reduction in the available groove volume, as well as the reduction in the active edge length when the tread is worn down to the level of these platforms.

SUMMARY

The object of embodiments of the invention is to propose a solution to the problem outlined above, namely that of providing a tread pattern for a civil engineering vehicle tire requiring a large thickness of wearable material (that is to say, having grooves with a depth of at least 25 mm) while creating long active edges in the new state, these edges being orientated both circumferentially and transversely, and while limiting the undesirable effects of the differences in distances travelled in the contact patch between the different circumferential rows.

In this context, an "active edge in the new state" means an edge present on the rolling surface of the tread, notably in the new state.

Heavy duty vehicle tires having a thickness of wearable material of less than 20 mm, which is less than the thickness of the tires of the invention, are known from the prior art. Notably, U.S. Pat. No. 4,320,790 describes a heavy duty vehicle tread pattern comprising marginal ribs and a plurality of rows of blocks placed axially between these ribs, all of these blocks being delimited axially by circumferential grooves of zigzag shape. This document provides no description of a variant corresponding to the invention in any way, since the area between the shoulder ribs is highly flexible because of the presence of multiple circumferential grooves, and application to thick tires (at least 25 mm in thickness) would therefore result in accelerated wear.

DEFINITIONS

The proportion of voids per unit of surface of a tread pattern is equal to the ratio between the surface of the voids (essentially formed by the grooves) delimited by the relief elements (blocks and ribs) and the total surface (the contact surface of the relief elements and the surface of the voids). A low proportion of voids indicates a large contact surface of the tread and a small surface of voids between the relief elements.

A block is a relief element formed on a tread, this element being delimited by voids or grooves and comprising lateral walls and a contact face, the latter being intended to come into contact with the road during running.

A rib is a relief element formed on a tread, this element extending in a circumferential direction around the whole of the tire. A rib comprises two lateral walls and a contact face, the latter being intended to come into contact with the road during running.

The term "radial direction" denotes a direction which is perpendicular to the axis of rotation of the tire (this direction corresponds to the direction of the thickness of the tread).

The term "transverse direction" or "axial direction" denotes a direction parallel to the axis of rotation of the tire.

The term "circumferential direction" denotes a direction which is tangent to any circle centred on the axis of rotation. This direction is perpendicular to both the axial direction and a radial direction.

The usual running conditions of the tire, or its conditions of use, are those defined by the ETRTO standard; these conditions of use specify the reference inflation pressure corresponding to the load capacity of the tire indicated by its load index and its speed code. These conditions of use may also be called the "nominal conditions" or "usage conditions".

The present disclosure is intended to improve the performance of tires for civil engineering vehicles having thick treads (that is to say, treads whose grooves have a depth of at least 25 mm), having long active edges in the new state, these edges being orientated both circumferentially and transversely, the tires having high performance in respect of wear and grip, and having excellent resistance to any cracking that may occur in the bottoms of grooves.

To this end, an embodiment of the invention proposes a tire tread, this tread of rubber material having a thickness at least equal to the thickness of material that is wearable during running.

This tread comprises two grooves having a generally circumferential orientation and having a depth Pc, these grooves dividing the tread into a central region and two edge regions.

The central region comprises a plurality of generally transversely orientated grooves, having a depth Pt and a mean width Dt, these transverse grooves and the circumferential grooves delimiting a plurality of blocks in the central row, spaced apart from each other in the circumferential direction. Each block has lateral walls and a contact wall, this contact wall being intended to come into contact with the ground during running, the lateral walls cutting the contact wall along edges, some of which are orientated in the circumferential direction, while the others are orientated in the transverse direction. Each block of the central row has a width Ltb measured in a direction parallel to the transverse edges, and a width Lcb measured in the circumferential direction. Each block comprises two end parts, each facing an edge rib.

Additionally, each edge row is formed by a continuous rib having a contact wall intended to come into contact with the ground during running and two lateral walls spaced at a distance Ltn corresponding to the maximum width of the rib, one of these lateral walls delimiting a circumferential groove.

The tread according to an embodiment of the invention is characterized in that the lateral wall of each edge rib comprises a plurality of recesses, forming housings, with a transverse width Lte and a circumferential length Lce, each recess being delimited over the whole of its height He by transversely orientated walls and a circumferentially orientated wall, each recess having a suitable geometry to receive at least an end part of a block of the central region with a circumferential clearance Ac (measured in the circumferential direction) and a transverse clearance At (measured in the transverse or axial direction), these clearances Ac and At being determined so as to ensure that, in the usual running conditions of the tire provided with said tread, each end part of said block of the central region is at least partially in contact with transversely orientated walls of the recess, thereby preventing each of the blocks, having its ends locked in said recesses, from coming into contact with the neighbouring blocks of the central row, in order to preserve a storage capacity in each transverse groove in the passage through the contact patch during the running of the tire.

In this context, "circumferential clearance Ac" means that this clearance is present between each transversely orientated wall of the recess and the end part intended to interact with said recess.

The invention, in certain embodiments, makes it possible for the blocks of the central region of a thick tread, that is to say a tread with a thickness of at least 25 mm, to be made to operate in favourable conditions, so as to maintain a space between said blocks of the central region, both in straight-line running conditions under load and in cornering conditions. Because of these arrangements, the effects caused by differences in the distances travelled by the different rows of a tread can be reduced, while ensuring that the blocks of the central row are locked by the edge rows.

Preferably, the transverse edges of the blocks of the central row are inclined at an angle of not more than 35 degrees to the axis of rotation of the tire provided with the tread according to an embodiment of the invention.

According to a variant of the invention, and in order to improve further the locking of the blocks of the central row, the length Ltp of each block end entering a recess is at least equal to 7% of the total transverse width Ltb of said block, and, even more preferably, is at least equal to 15% of the same total width Ltb.

Clearly, the dimensions of the recesses and of the end parts of the blocks intended to interact with said recesses can be made to differ between the two edges of the tire.

In another variant of the invention, the length of each block end entering a recess varies with the depth: this length is maximal on the rolling surface of the tread in the new state, and decreases with depth. Preferably, the maximum length on the rolling surface in the new state is at least equal to 15% of the total transverse width Ltb of the block.

To increase further the locking of the blocks of the central row on the edge ribs, it may be useful to form, on the walls delimiting the recesses, means for interacting with means provided on the end walls of the blocks of the central row.

Preferably, the whole of each end of the blocks of the central row is designed so as to interact with a recess in an edge rib.

Preferably, the transverse dimension Lte of the recesses is greater by at least 30% than the clearance At provided in the transverse direction.

The embodiments of the invention are particularly useful for thick treads, notably those having a thickness in the range from 25 mm to 110 mm (where "thickness" denotes the height of wearable material).

Other characteristics and advantages of embodiments of the invention will be apparent from the following description provided with reference to the appended drawings, which show, by way of non-limiting examples, variant embodiments of what is proposed by the invention.

DETAILED DESCRIPTION OF SPECIFIC EMBODIMENTS

Figure 1:
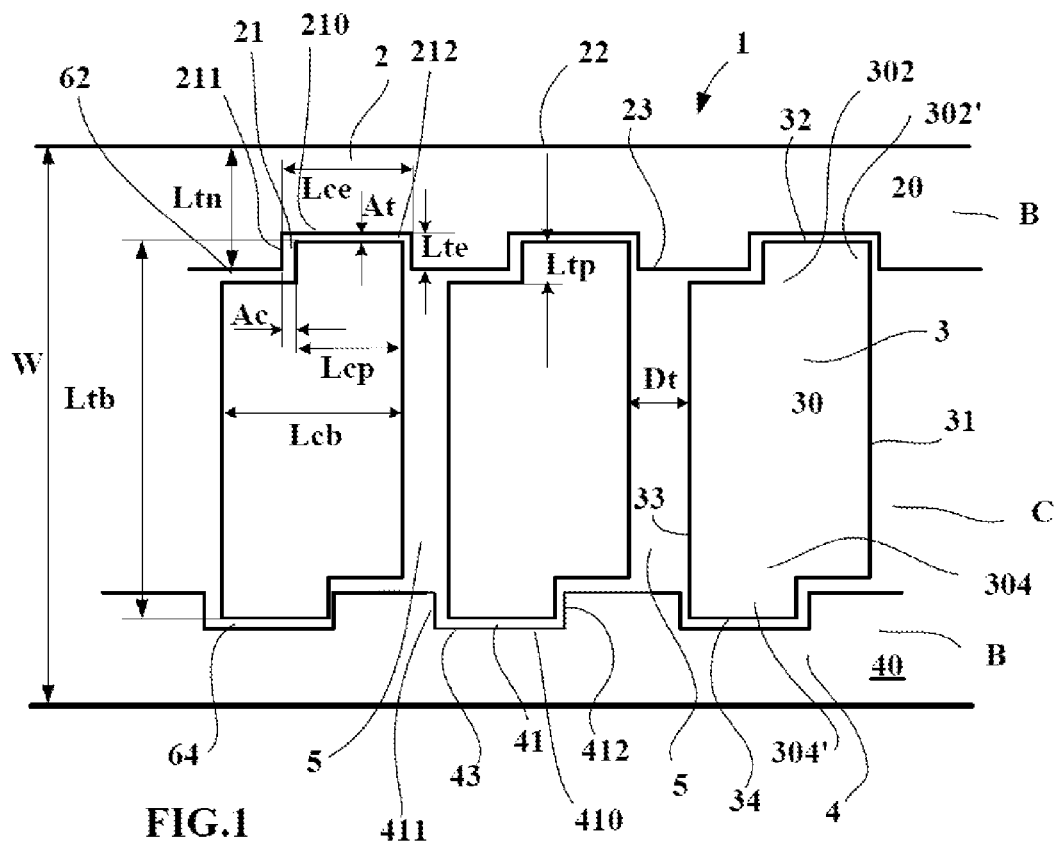
FIG. 1 shows a plan view of part of the rolling surface of a tread according to a first embodiment of the invention.

In the drawings accompanying this description, the same reference symbols are used to describe variants of the invention where these reference symbols signify elements which are of the same kind in respect of their structure or function.

FIG. 1 shows part of a rolling surface of a tread 1 of a civil engineering tire with a size of 18.00 R 33. This tread is provided with a pattern formed by three circumferential rows, namely two edge rows B and a central row C. The tread has a total width W which is equal to 440 mm in the present case.

These rows B and C are separated by generally circumferentially orientated grooves 62, 64 having a depth Pc equal to 70 mm and a mean width Dc equal to 20 mm.

The central row C comprises a plurality of blocks 3 delimited from one another by transverse grooves 5 having a mean width Dt equal in the present case to 15 mm and a depth Pt equal to 70 mm.

Each block 3 of the central region C comprises a contact face 30 intended to come into contact with the ground during running, as well as front and rear lateral faces and end faces. The lateral faces of each block cut the contact face along lines forming transverse edges 31, 33 and circumferential edges 32, 34.

Each block 3 of the central row has a maximum transverse width Ltb and a circumferential width Lcb.

Each edge row B is formed by a circumferentially continuous rib 2, 4 having a width Ltn. The rib 2 at the top of FIG. 1 comprises a contact face 20 and two lateral faces 22 and 23, the latter of these lateral faces 23 delimiting, in conjunction with the lateral faces of the blocks 3 of the central row C, the circumferential groove 62.

Additionally, the lateral face 23 of the rib 2 comprises a plurality of recesses 21, the number of recesses being equal to the number of blocks 3 of the central part C. Each recess 21 forms a housing for receiving part of a lateral end 302 of a block 3 of the central row. Each recess 21 is delimited by a circumferential face 210 having a circumferential length Lce and two transverse faces 211, 212 having a transverse width Lte.

In the case described here, the lateral end part 302 of each block 3 comprises a part 302' which is offset in the transverse direction, this offset part 302' being intended to be located in the recess 21. This offset part 302' has dimensions Lcp and Ltp which are appropriate for fitting into the recess 21 while maintaining a clearance At in the transverse direction 5 with the circumferential face delimiting the recess and a clearance Ac in the circumferential direction with each of the transverse faces delimiting the recess. In the illustrated case, the clearance Ac is the same on each side of the end part 302', but it would be entirely possible to provide different values while still achieving the desired object of the invention. These clearances Ac and At may be reduced as much as possible, but it may be necessary to maintain a drainage volume which requires a non-zero value for these clearances.

The same construction is provided on the other edge rib 4, with the difference that the recesses 41 formed on this rib 4 are offset circumferentially with respect to the recesses 21 of the other rib 2. Thus the offset parts 302', 304' of the same block 3 designed to interact with a recess 21 on a rib 2 and a recess 41 on the other rib 4 are offset in the circumferential direction in order to provide more symmetrical operation, regardless of the direction of running. An offset part 304' of the block 3 is provided with the same geometrical characteristics in order to interact with the walls 411, 412 of the recess 41 in the rib 4.

In the variant described with the aid of this FIG. 1, the transverse lengths Ltp of the offset parts 302', 304' of the ends of the blocks 3 provided to interact with the recesses are equal to 10% of the total transverse width Ltb of said blocks 3.

Figure 2:
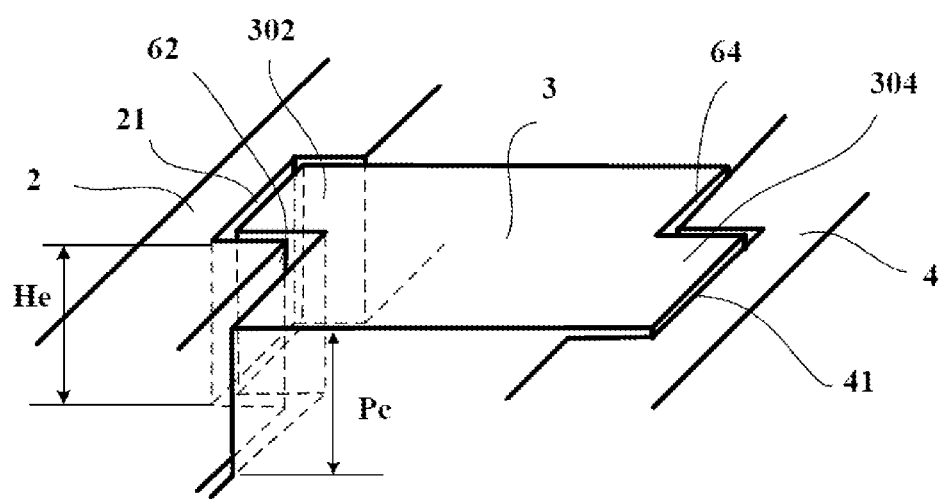
FIG. 2 shows a local view in perspective of the variant shown in FIG. 1, in an initial configuration.

FIG. 2 shows a local view in perspective of a block 3 in an unstressed position. In this FIG. 2, it can be seen that the recess 21 in the rib 2 and the recess 41 in the rib 4, with which the lateral ends 302', 304' of the block 3 interact, extend from the rolling surface in the new state to a depth He which is equal to the depth Pc of the circumferential grooves 62, 64 separating the block 3 from the edge ribs 2, 4.

Figure 3:
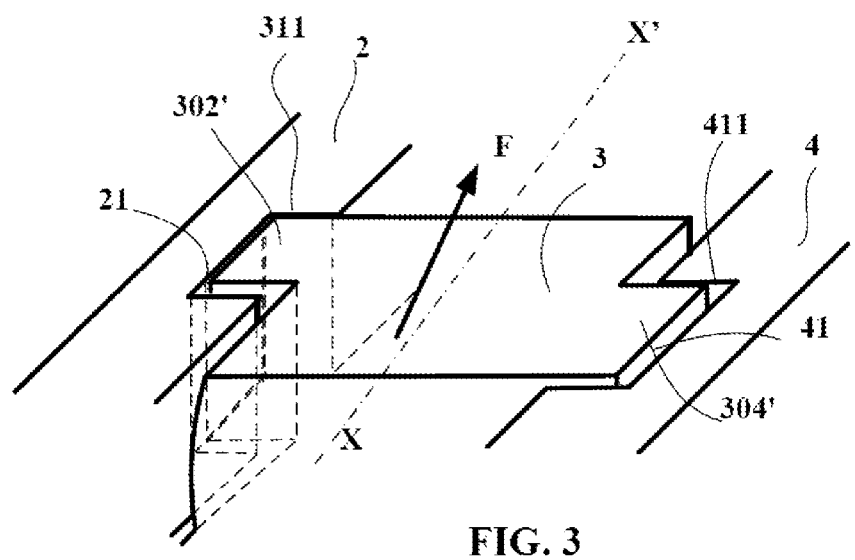
FIG. 3 shows a local view in perspective of the variant shown in FIG. 1, in a running configuration.

FIG. 3 shows the same local view in perspective of a block 3 in a position corresponding to a configuration during running. In this configuration, the offset parts 302', 304' of the lateral ends of the block 3 are in contact with the transverse faces of the recesses 21 and 41 formed in the ribs 2 and 4. Since the circumferential clearance Ac is smaller than the width of the transverse grooves 5 between the blocks 3 of the central row, the width of said grooves is reduced by an equivalent amount, but a transverse groove space which is useful when running is retained. Additionally, the mechanical stresses at the bottoms of grooves are reduced by this operation. The arrow F indicates the resultant direction of the shear strain of the block 3. In this case, this direction F forms a non-zero angle with the circumferential direction indicated by the direction XX' and corresponds to a curved path followed by the tire: at least the end part of the block located on the outer side in cornering bears simultaneously against the circumferential face of the recess and against a transverse face of the same recess.

In a variant which is not shown, the present invention can be combined with the addition of platforms created between the blocks of the central row. Notably, these platforms can maintain a sufficient separation, with blocks inserted between the blocks interacting with recesses in the edge ribs, these inserted blocks not interacting with said edge ribs by means of end parts that are locked in housings formed in said ribs.

Figure 4:
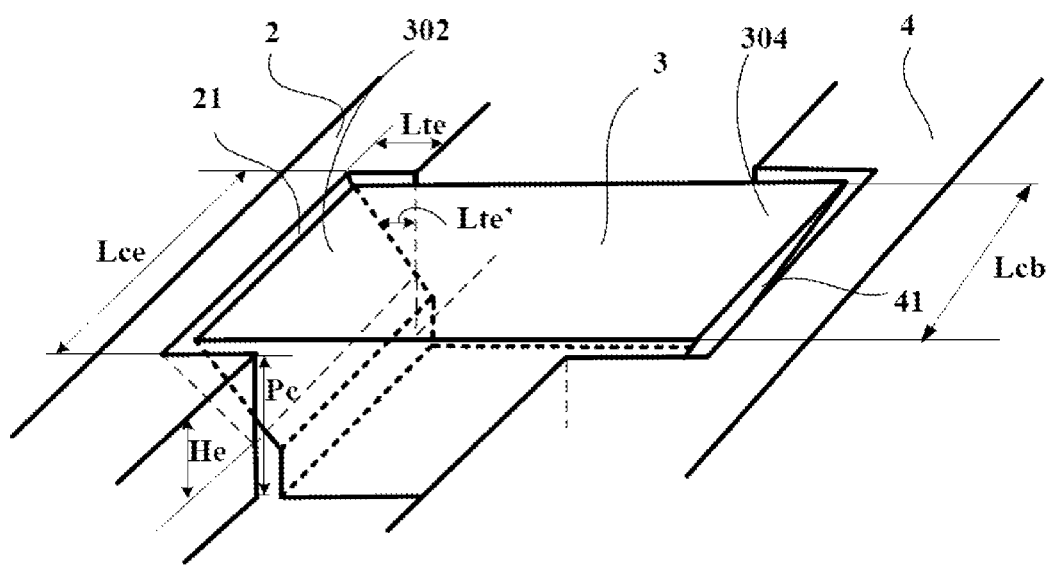
FIG. 4 shows a local view in perspective of a variant of the invention.

In another variant shown in FIG. 4, the recesses 21 and 41 formed in the ribs 2 and 4 and the transverse end parts 302, 304 of the blocks 3, intended to interact with one another, are formed so as to have dimensions that vary with the degree of wear of the tread. Thus each recess may have dimensions Lce and Lte on the rolling surface in the new state and dimensions Lte' which vary continuously and become equal to zero at a specified depth He. This specified depth He may be equal, for example, to at least 50% of the depth Pc of the circumferential groove separating the edge rib from the blocks of the central row.

The benefit of this variant is that a rib with a large contact surface is restored after partial wear, in view of the fact that, based on this level of partial wear, the bending strain and shear strain of the blocks in ground contact are reduced because the heights of the blocks (the distance between the rolling surface and the bottoms of the grooves) have decreased and the stiffness of said blocks has increased.

In the case illustrated in FIG. 4, it is the whole circumferential width Lcb of each transverse end 302, 304 of a block 3 that interacts with a recess formed in a shoulder rib.

In another variant that is not shown, the recess may have a circumferential length Lce varying with the level of wear, this variation possibly being combined with a variation in the transverse width Lte of the same recess.

The illustrated variants show blocks whose transverse edges are parallel to the direction of the axis of rotation (vertical line in the drawing). If the blocks have edges inclined with respect to the axis of rotation, up to an angle of 35 degrees, the transverse faces of the recesses are formed so as to be parallel to the transverse lateral faces of the blocks of the central part. In this case, the width Lte of the recesses is measured parallel to the direction of the edge formed by the recesses on the contact face 20 of the rib.

The invention has been described in general terms, supported by a number of variants, but it is to be understood that this invention is not limited to these described and illustrated variants alone. Clearly, various modifications can be made to it without departure from the general context of the present invention.

The invention claimed is:

1. A tread for a civil engineering tire, having a thickness of material wearable during running in the range from 25 mm to 110 mm, comprising:
    two generally circumferentially orientated grooves having a depth Pc dividing the tread into a central region (C) and edge regions (B),
    the central region (C) comprising:
        a plurality of generally transversely orientated grooves, having a depth Pt and a mean width Dt, the transverse grooves and the circumferential grooves delimiting:
        a single row comprising a plurality of blocks spaced apart from one another in the circumferential direction, each block having:
            a contact wall intended to come into contact with the ground during running, and
            lateral walls cutting the contact wall along edges, some of which are orientated in the circumferential direction, while the others are orientated in the transverse direction,
            a width Ltb measured in a direction parallel to the transverse edges, and
            a width Lcb measured in the circumferential direction, each edge region (B) being formed by a continuous rib having a contact wall intended to come into contact with the ground during running and two lateral walls spaced apart at a distance Ltn corresponding to the maximum width of the rib, each of these lateral walls delimiting with the blocks a circumferential groove,
    wherein the lateral wall of each edge rib comprises a plurality of recesses with a transverse width Lte and a circumferential length Lce, each recess being delimited over the whole of its height He by transversely orientated walls and a circumferentially orientated wall, each recess having a suitable geometry to receive at least an end part of a block of the central region (C) with a circumferential clearance Ac, measured in the circumferential direction, and a transverse clearance At, measured in the transverse or axial direction, these clearances Ac and At being determined so as to ensure that, in the usual running conditions of the tire provided with said tread, each end part of said block of the central region is at least partially in contact with transversely orientated walls of the recess, in such a way that each of the blocks, having its ends locked in said recesses is prevented from coming into contact with the neighbouring blocks of the central row (C), and
    wherein the length Ltp of each end of a block entering a recess is at least equal to 7% of the total transverse width Ltb of said block.

2. The tread according to claim 1, wherein the length Ltp of each end of a block entering a recess is at least equal to 15% of the total transverse width Ltb of said block.

3. The tread according to claim 1, wherein the length Ltp of each end of a block entering a recess varies with the depth, and wherein this length Ltp is maximal on the rolling surface of the tread in the new state, and decreases with the depth.

4. The tread according to claim 3, wherein the length Ltp of each end of a block entering a recess measured on the rolling surface in the new state is at least equal to 15% of the total transverse width Ltb of said block.

5. The tread according to claim 1, wherein the transverse edges of the blocks of the central row are inclined at an angle of not more than 35 degrees to the axis of rotation.

6. The tread according to claim 1, wherein the transverse dimension Lte of each recess is at least 30% greater than the clearance At measured in the transverse direction between one end of a block and one of the transverse walls of said recess.

* * * * *